Patented Mar. 16, 1937

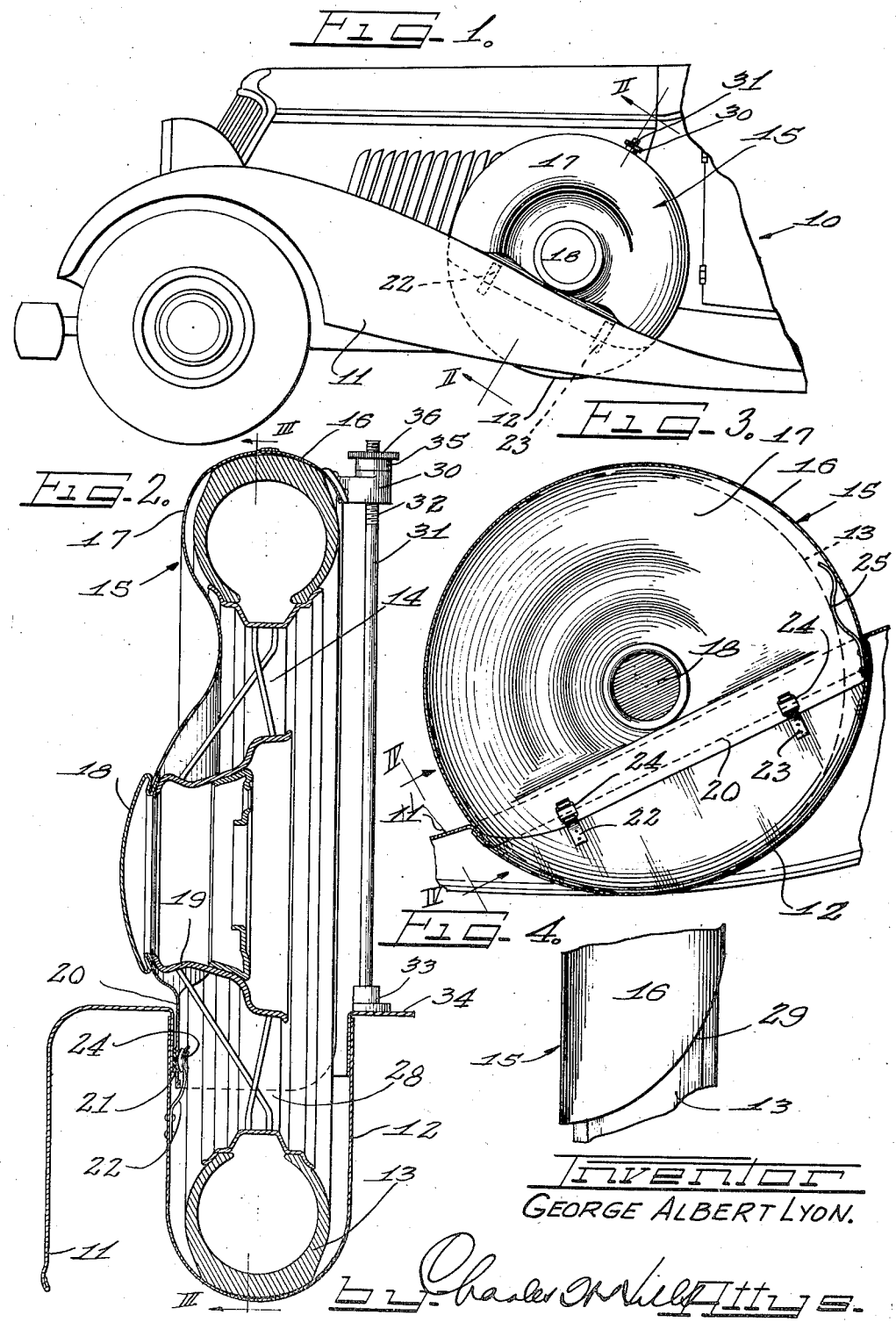

2,073,749

UNITED STATES PATENT OFFICE 2,073,749

COMBINATION SPARE TIRE WELL AND COVER

George Albert Lyon, Detroit, Mich., assignor to Lyon Incorporated, Detroit, Mich., a corporation of Delaware Application June 26, 1933, Serial No. 677,548

14 Claims  (Cl. 224—29)

This invention relates to automobile spare wheel installations and more particularly to a combination spare wheel well and cover.

An object of this invention is to provide an improved cover for a spare wheel on an automobile of the type mounted on one of the fenders of the vehicle.

Another object of this invention is to provide a combination spare tire well and cover wherein the cover is maintained in tight cooperation with the front end and outer side of the fender well.

In accordance with the general features of this invention, there is provided a spare tire cover for a spare wheel and tire disposed in the fenderwell, which cover includes portions for covering the exposed outer side and tread of the tire and a spring inside the forward end of the cover tensioned to force the cover forward on the tire into contact with the front end of the well.

Another feature of the invention relates to the provision of means inside of the well in the form of spring clips formed to receive a lower portion of the cover as the cover is forced downwardly into telescoping cooperation with the well.

Still another feature of the invention relates to the provision of a relatively straight portion at the lower end of the cover for substantially a line contact with the outer side of the well whereby the appearance of the device is materially enhanced.

Other features of this invention will more fully appear from the following detailed description taken in connection with the accompanying drawing which illustrates a single embodiment thereof, and in which Figure 1 is a fragmentary side view of an automobile with my novel combination spare tire well and cover applied thereto.

Figure 2 is an enlarged vertical sectional view taken on substantially the line II—II of Figure 1 looking in the direction indicated by the arrows.

Figure 3 is a view partly in section taken on the line III—III of Figure 2 looking in the direction indicated by the arrows and drawn at a reduced scale.

Figure 4 is a fragmentary rear end view of the cover on the tire taken on substantially the line IV—IV of Figure 3.

The reference character 10 designates generally an automotive vehicle having a fender 11 provided with a fenderwell 12. Disposed in this fenderwell is a conventional spare tire 13 and wheel 14.

Associated with this well 12 is a spare tire cover 15 embodying the features of this invention. This cover includes a circular tread covering portion 16 convexly curved to form a channel in which is disposed the outer periphery of the tire 13. The closure also includes an arcuate side wall 17 which is also convexly curved so as to fit over the exposed outer side wall of the spare tire 13. This side covering portion 17 of the cover terminates centrally of the spare wheel in an integral wheel hub closure 18 adapted to be aligned with the opening in the wheel hub 19. It should be noted that this wheel hub closure 18 may be made from a separate piece of metal as illustrated and lock seamed to the central part of the outer side covering portion 17 of the tire cover or closure.

The lower or bottom end of the side covering portion 17 is flattened as indicated at 20 so as to have substantially a line contact with the inner surface of the outer side wall of the fenderwell 12. Moreover, this flat portion 20 may be provided with an anti-rattle or cushioning strip 21 (Figure 2) secured thereto in any suitable manner. This strip may be of felt, rubber or the like, and may be secured either to the flattened portion 20 or to the inside surface of the outer side wall of the fenderwell 12.

Positioned in and secured to the well 12 are a pair of spaced spring clips 22 and 23 formed to yieldably engage the inner surface of the flattened portion 20 of the tire cover as best shown in Figures 2 and 3. Each of these curved spring clips may be provided with a rubber shoe 24 or the like so as to avoid a metal to metal contact as between the springs and the flattened portion 20. It will of course be evident that as the tire cover is shoved downwardly into telescoping cooperation with the fenderwell 12, the flattened portion 20 of the cover is brought into engagement with the two spring clips 22 and 23 and is forced outwardly against the inner surface of the outer side wall of the fenderwell 12. This is advantageous in that it enables the flattened lower end of the tire cover to tightly hug the inner surface of the fender well 12, thus providing a tight fit between that part of the tire cover and the fender well. Furthermore, the resilient clips 22 and 23 act to grip the portion 20 of the cover and thereby aid in holding the cover in proper position with reference to the fenderwell.

In Figure 3 it will be observed that the tire cover 15 is made of a slightly larger diameter than that of the outer periphery of the tire 13. Also the front end of the tread covering portion 16 of the tire cover is provided with a curved spring 25 having its lower end secured to the tread covering portion 16 and having its other end free and located inside the cover for yieldable contact with the tire tread. This arrangement is such that when the cover is shoved downwardly over and into covering relation to the tire, the spring 25 acts to yieldably move the cover bodily into eccentric relation to the tire 13 as shown in Figure 3, in which the tire tread is in dotted lines. The tread covering portion 16 contacts with the forward and rear ends of the fender well 12, and cooperates wedge-like with said ends.

Thus I have provided novel spring means 22 and 25 for bodily shifting the cover with reference to the spare tire as the cover is shoved into covering position on the tire whereby the cover is caused to tightly hug the outer side wall of the fenderwell at the mouth of the fenderwell. Means described below is provided to cause the cover to tightly hug the front end also of the mouth of the well. This is highly desirable for the reason that it enhances the appearance of the combination cover and fenderwell in which the spare tire is disposed. Moreover, the spring 25 substantially prevents movement of the tire in the cover and hence rattling therebetween.

It should also be noted that the forward end of the cover may be cut off as illustrated by the dotted lines in Figure 2 which is designated by the reference numeral 28.

The rear end of the tire cover may be cut off on a diagonal curve as designated by the numeral 29 in Figure 4. The latter construction is advantageous in that it facilitates the application of the cover to the tire in the event the cover is slightly oversize so that some flexing of the cover may be required in order to properly dispose the cover on the tire. Also it prevents a rear corner of the cover from biting into the tread of the tire.

In order to force the cover downwardly in the well and into proper cooperation with the well and the spare tire 13, there is provided a pull-down device which is illustrated as being disposed at the rear side of the spare tire assembly. This pull-down device embodies an arm 30 fastened to the rear marginal portion of the tread covering portion 16 of the cover. This arm 30 has a bore through which extends a rod 31, the upper end of which is threaded as indicated at 32. The lower end of the rod 31 is fastened at 33 to the apron 34 alongside the fenderwell 12. Threadingly disposed on the upper end of the rod 30 is a nut-like member 35 including a knurled portion or handle 36 by means of which the member may be turned to force the arm 30 and cover downwardly on the rod 31 and into proper telescoping cooperation with the fenderwell 12.

Now it is of course to be understood that while I have illustrated and described in detail the preferred embodiment of this invention, the invention is not to be thus limited but only insofar as defined by the scope and spirit of the appended claims.

I claim as my invention:

1. In combination with a spare tire in a well of an automobile, a cover for the tire and formed to telescope said well, including portions for covering the exposed outer side and tread of the tire and means for guiding the cover relative to the well and for pressing the cover tightly against the outer side wall of said well, thereby providing a tight fit between the cover and outer side of the well.

2. In combination with a spare tire in a well of an automobile, a cover for the tire and formed to telescope said well, including portions for covering the exposed outer side and tread of the tire, means for guiding the cover relative to the well and for pressing the cover tightly against the outer side wall of said well, thereby providing a tight fit between the cover and outer side of the well, and a spring inside the forward end of the cover tensioned to force the cover forward on the tire as the cover is shoved into proper covering relation to the tire.

3. In combination with a spare tire in a well of an automobile, a cover for the tire and formed to telescope said well, including portions for covering the exposed outer side and tread of the tire, means for guiding the cover relative to the well and for pressing the cover tightly against the outer side wall of said well, thereby providing a tight fit between the cover and outer side of the well, and a spring inside the forward end of the cover tensioned to force the cover forward on the tire as the cover is shoved into proper covering relation to the tire, said means including a spring clip inside of the well formed to receive a lower portion of said cover as the cover is forced downwardly into telescoping cooperation with the well.

4. A cover for a spare tire mounted on a wheel having a hub and disposed in a fender well or the like, said cover being bodily separable from the fender and comprising portions for substantially covering the outer side and tread of the tire, said tread covering portion being channeled to receive the outer periphery of the tire, said side covering portion including a transversely curved disc-like portion terminating at the center of the cover in a wheel hub closure and at its lower end in a relatively straight portion for substantially a line contact with the inner surface of the outer side wall of the well.

5. A cover for a spare tire mounted on a wheel having a hub and disposed in a fender well or the like, said cover being bodily separable from the fender and comprising portions for substantially covering the outer side and tread of the tire, said tread covering portion being channeled to receive the outer periphery of the tire, said side covering portion including a transversely curved disc-like portion terminating at the center of the cover in a wheel hub closure and at its lower end in a relatively straight portion for substantially a line contact with the inner surface of the outer side wall of the well, said lower straight portion having connected to it yieldable material for establishing a cushion between said lower portion and the inner surface of said outer side of the well.

6. In combination with a spare tire in a well of an automobile, a cover for the tire and formed to telescope said well, said cover including portions for covering the exposed outer side and tread of the tire, and means for guiding the cover relative to the well and for pressing the cover tightly against the outer side wall of said well, thereby providing a tight fit between the cover and the outer side of the well, and means for forcing the cover downwardly into proper telescoping cooperation with the well.

7. In combination with a spare tire in a well of an automobile, a cover for the tire and formed to telescope said well, including portions for covering the exposed outer side and tread of the tire, means for guiding the cover relative to the well and for pressing the cover tightly against the outer side wall of said well, and means including a lateral arm connected to the tread covering portion and cooperating with means carried by the automobile for exerting downward pressure on the cover.

8. A cover for a spare tire carried in an automobile fender well or the like, said cover comprising a relatively rigid one-piece tread covering portion of such circumferential extent as to telescope the well to thereby conceal the part of the tread above the well, the distance between the ends of said portion being greater than the diameter of the tire and the cover being so formed as to be readily shoved downwardly onto the tire and cover the tread throughout more than 180°, guide means arranged to cooperate with said cover so as to guide the same into proper cooperative relation with the well and tire, and resilient means for preventing rattling between the cover and the tire after the cover is mounted in proper cooperative relation to the tire and well.

9. A cover for a spare tire carried in an automobile fender well or the like, said cover comprising a relatively rigid one-piece tread covering portion constructed and arranged to be shoved onto the tire in substantially the plane of the tire, guide means arranged to cooperate with a substantially central part of said portion so as to cause said part to move in a substantially radial direction relative to the tire and into proper cooperative relation with the well and tire, and resilient means for preventing rattling between the cover and the tire after the cover is mounted in proper cooperative relation to the tire and well.

10. A cover for a spare tire carried in an automobile fender well or the like, said cover comprising a relatively rigid one-piece tread covering portion of such circumferential extent as to telescope the well to thereby conceal the part of the tread above the well, the distance between the ends of said portion being greater than the diameter of the tire and the cover being so formed as to be readily shoved downwardly onto the tire and cover the tread throughout more than 180°, and spring means mounted in the well and arranged to form with the well a pocket to guide and receive the lower part of the cover and hold the same in position and prevent rattling between the cover and the well.

11. In combination with a spare tire in a well of an automobile, a cover for the tire and formed to telescope said well, said cover including portions for covering the exposed outer side and tread of the tire, means for guiding the cover relative to the well and for pressing the cover tightly against the end walls of said well, thereby providing a tight fit between the cover and said walls, and a spring clip inside of the well and formed to receive a lower portion of said cover as the cover is forced downwardly into telescopic co-operation with the well.

12. In combination with a spare tire in a well of an automobile, a cover for the tire and formed to telescope said well, said cover including portions for covering the exposed outer side and tread of the tire, and means for guiding the cover relative to the well and for pressing the cover tightly against the end walls of said well, thereby providing a tight fit between the cover and said end walls, and spaced yieldable gripping means inside of the well and against which the lower end of the cover is forced as the cover is shoved into proper covering relation to the tire.

13. A cover for a spare tire disposed in a fender well or the like, said cover being bodily separable from the fender and comprising portions for substantially covering the exposed outer side and tread of the tire, said tread covering portion being channeled to receive the outer periphery of the tire, and said side covering portions being formed to cover the outer side wall of the tire and including a relatively straight portion at its lower end for substantially a line contact with the inner surface of the outer side wall of the well, and a yieldable element on the interior of the cover and secured to said tread covering portion so as to yieldably hold the cover in an eccentric position with respect to the tire.

14. In combination with a spare tire in a well of an automobile, an open ended cover for the tire and formed to telescope said well including portions for covering the exposed outer side and tread of the tire, a spring located at one side of the cover adjacent its open end formed to be deflected by the application of the cover to the tire in the well for bodily shifting the cover on the tire so that the opposite side of the cover is forced into a snug fit with the tire tread at said side, and means for holding the cover in the well under the action of said spring means.

GEORGE ALBERT LYON.